United States Patent [19]

Lat et al.

[11] Patent Number: 5,178,903

[45] Date of Patent: Jan. 12, 1993

[54] COATED METAL FASTENER AND METHOD FOR MAKING SAME

[75] Inventors: Geronimo E. Lat, Prospect Heights; William L. Gabriel, Barrington, both of Ill.

[73] Assignee: Illinois Tool Works Inc., Glenview, Ill.

[21] Appl. No.: 556,943

[22] Filed: Jul. 23, 1990

Related U.S. Application Data

[62] Division of Ser. No. 414,793, Sep. 29, 1989, Pat. No. 4,964,774.

[51] Int. Cl.$^5$ ............................................. B05D 1/08
[52] U.S. Cl. ...................... 427/446; 427/388.4; 427/405; 427/406; 427/409; 427/435; 427/456
[58] Field of Search ............... 411/446, 466, 902, 487, 411/903, 908; 427/388.4, 430.1, 34, 423, 405, 406, 409, 435

[56] References Cited

U.S. PATENT DOCUMENTS

| | | | |
|---|---|---|---|
| 3,853,606 | 12/1974 | Parkinson | 411/903 |
| 4,307,000 | 12/1981 | Vasta | 428/423.1 |
| 4,452,834 | 6/1984 | Nachtkamp et al. | 427/388.4 X |
| 4,837,090 | 6/1989 | Hyner et al. | 411/903 X |
| 4,897,231 | 1/1990 | Schearer et al. | 427/428 X |
| 4,964,774 | 10/1990 | Lat et al. | 411/446 |

FOREIGN PATENT DOCUMENTS 1921753 11/1970 Fed. Rep. of Germany ...... 411/903

*Primary Examiner*—Michael Lusignan
*Attorney, Agent, or Firm*—Schwartz & Weinrieb

[57] ABSTRACT

A metal fastener, suitable for use in connection with wood construction and coated with a polymeric residue produced by removing water from an aqueous dispersion of a film-forming, thermoplastic, predominantly aliphatic polyurethane resin, so as to thereby reduce penetration force, increase withdrawal force, and protect against corrosion, is disclosed. Before the polyurethane coating is applied, a zinc layer is applied so as to coat the fastener, and a chromate conversion layer is applied so as to coat the zinc layer.

24 Claims, 1 Drawing Sheet

COATED METAL FASTENER AND METHOD FOR MAKING SAME

This is a division of application Ser. No. 07/414,793, filed Sep. 29, 1989, now U.S. Pat. No. 4,964,774.

TECHNICAL FIELD OF THE INVENTION

This invention pertains to a metal fastener, such as, for example, a nail, staple, or truss plate, which exhibits excellent properties including a reduced penetration force, an increased withdrawal force, and a reduced corrosion tendency. This invention also pertains to a method of coating such a fastener so as to provide the foregoing properties.

BACKGROUND OF THE INVENTION

Generally, it is known to protect various metal fasteners and other metal articles against corrosion by means of electroplating their surfaces with zinc and chromating the electroplated surfaces. Moreover, it is known to cover the chromated surfaces with polymeric materials.

In Palisin, Jr., U.S. Pat. Nos. 3,790,355 and 3,977,839, hydrophobic, thermosetting polymers made from coating compositions containing hexamethoxy methyl melamine are proposed for covering such chromated surfaces. In Labenski et al. U.S. Pat. No. 4,003,760, so-called fluoroplastic materials, such as, for example, polytetrafluoroethylene, are proposed for covering such chromated surfaces.

Parkinson et al. U.S. Pat. No. 3,853,606 discloses a coating composition that is described therein as combining properties of increased holding power, corrosion resistance, and lubrication. The coating composition contains two thermoplastic resins, namely a flexible carboxyl or substituted carboxyl-containing resin and a rosin-like resin. An organic solvent is required, which is undesirable in an industrial environment because such a solvent produces hazardous vapors and hazardous wastes.

Metal fasteners used in connection with wooden construction present special requirements, for which polymeric materials used to protect metal articles of other types may not be well suited. These fasteners include nails, staples, and truss plates. Typically, the metal of such fasteners is carbon steel.

Desirably, a polymeric material covering a metal fastener used in connection with wood construction should serve not only to protect the fastener against corrosion but also to cause the fastener to exhibit an increased withdrawal force when the fastener has been driven into a wooden workpiece. Withdrawal force, which may also be discussed in terms of holding power, is the force that is required to withdraw such a fastener from a given workpiece.

Furthermore, a polymeric material covering a metal fastener used in connection with wood construction should resist chipping or tearing away, particularly when the fastener is struck by means of a driving element of a pneumatically powered, combustion-powered, or other rapidly acting fastener-driving tool.

Optimally, a polymeric material covering a metal fastener used in connection with wood construction would serve moreover to cause the fastener to exhibit a decreased penetration force when the fastener is driven into a wooden workpiece. Penetration force is the force required to drive such a fastener into a given workpiece.

However, it is difficult to identify a polymeric material that would not require an organic solvent when applied to such a fastener and that would serve not only to protect the fastener against corrosion, to cause the fastener to exhibit an increased withdrawal force, and to resist chipping or tearing away, but also to cause the fastener to exhibit a reduced penetration force.

Although known coatings for metal articles may be generally satisfactory in many applications, there has been a need, to which this invention is addressed, for improved coatings for metal fasteners, particularly for metal fasteners suitable for wood construction, such as, for example, nails, staples, or truss plates.

SUMMARY OF THE INVENTION

This invention provides a metal fastener having a coating that does not require an organic solvent when applied to the fastener and that reduces penetration force, increases withdrawal force, resists chipping or tearing away, and protects against corrosion. This invention also provides a method for applying such a coating to a metal fastener.

This invention is applicable particularly but not exclusively to a metal fastener of a type made of carbon steel and suitable for wood construction. Preferably, the fastener is a nail, staple, or truss plate. However, fasteners made of aluminum and fasteners made of copper alloys, such as, for example, bronze, are equally well suited for the practice of this invention.

According to this invention, the fastener is coated with a thermoplastic, polymeric residue that contains a predominantly aliphatic polyurethane. The thermoplastic, polymeric residue provides a tough, adherent coating that reduces penetration force, increases withdrawal force, resists chipping or tearing away, and protects against corrosion. The thermoplastic, polymeric residue is produced by drying a film-forming, predominantly aliphatic polyurethane resin which is applied to the fastener in a liquid medium, preferably an aqueous medium. Thus, the polymeric coating does not require an organic solvent when applied to the fastener.

The liquid medium that contains the resin is applied, such as, for example, by means of dipping, spraying, roller coating, or like expedients, so as to coat a substantial part of the fastener, and preferably the entire fastener. The liquid is then removed at an elevated temperature so as to form a film from the resin that is present upon the fastener. Water is the preferred liquid medium for the resin.

For enhanced anti-corrosion properties, a metal fastener embodying the present invention can be galvanized within an electroplating or hot-dip process or otherwise precoated with a zinc layer prior to application of the thermoplastic, predominantly aliphatic polyurethane coating thereto. A chromate conversion layer can also be provided, if desired, over the zinc layer prior to application of the ultimate or outermost polyurethane coating, of the type hereinabove described, to the metal fastener.

The zinc and chromate conversion layers, if present, serve to provide corrosion protection in the event of localized chipping or tearing away of the aforenoted aliphatic polyurethane outermost coating as the metal fastener embodying the present invention is used. Such layers, if present, also provide corrosion protection if and where such ultimate or outermost coating does not completely cover the metal fastener.

A coated fastener according to this invention exhibits excellent properties including a reduced penetration force, an increased withdrawal force, and excellent protection against corrosion. The present fasteners are particularly well suited for use with wood that can be easily stained, such as, for example, cedar or redwood, and with wood that has been chemically treated, such as, for example copper-chromium-arsenate treated wood.

BRIEF DESCRIPTION OF THE DRAWINGS

These and other objects, features, and advantages of this invention will become more evident from the following description of a preferred embodiment of this invention with reference to the accompanying drawings in which like reference characters designate like or corresponding parts throughout the several views, and wherein.

DETAILED DESCRIPTION OF ILLUSTRATED EMBODIMENTS

Figure 1:
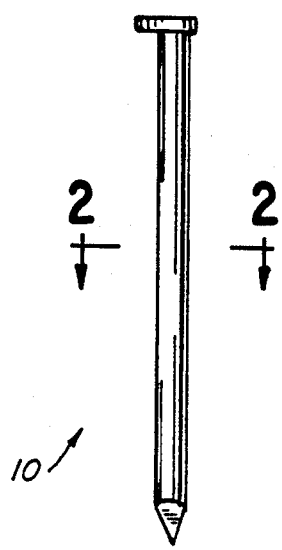
FIG. 1 is an elevational view of a nail constituting a preferred embodiment of this invention.

According to this invention, a metal fastener suitable for use in connection with wood construction has a thermoplastic, predominantly aliphatic polyurethane coating over substantially its entire metal surface. The coating resists chipping or tearing away and causes the fastener to exhibit excellent properties including a reduced penetration force, an increased withdrawal force, and a reduced corrosion tendency. The coated fastener is particularly well suited for use with wood that can be easily stained, such as, for example, cedar or redwood, and with wood that has been chemically treated, such as, for example, copper-chromium-arsenate treated wood.

The polyurethane coating is a polymeric residue that is produced by removing water from an aqueous dispersion of a film-forming, thermoplastic, predominantly aliphatic polyurethane resin, as specified below.

Preferably, the aqueous dispersion is applied to the nail or other fastener by dipping the nail into the aqueous dispersion so as to coat the fastener. The aqueous dispersion can be alternatively applied by means of spraying, roller coating, or like expedients, so as to coat the fastener.

After the fastener has been coated with the aqueous dispersion, the coated fastener is heated so as to remove water from the aqueous dispersion, thereby forming a film of the polymeric residue. The polymeric residue provides a tough, adherent, polymeric film that protects the fastener against corrosion, resists chipping or tearing away, and causes the fastener to exhibit a reduced penetration force as well as an increased withdrawal force.

Preferably, before the polymeric coating is applied thereto, the fastener is galvanized within an electroplating or hot-dip bath or the like or otherwise precoated with a zinc layer, over which a chromate conversion layer is applied. The zinc and chromate conversion layers coated upon the fastener protect the fastener against corrosion in the event of localized chipping or tearing away of the thermoplastic, predominantly aliphatic polyurethane coating, which constitutes the ultimate or outermost coating upon the fastener. The zinc and chromate conversion layers also protect the fastener against corrosion of the same, particularly where such ultimate or outermost coating does not completely cover the fastener.

The zinc layer may be conveniently applied by means of a known electroplating process. Preferably, the zinc layer has a thickness of approximately 0.2 to approximately 0.6 mil, and more preferably approximately 0.5 mil so as to comply with Federal Building Code FF-N-105B, which is referenced to American Society for Testing Materials (ASTM) Specification A641, Class 1, Type 2. Suitable electroplating processes are known in the art. See, for example, Lowenheim, Ed., *Modern Electroplating*, John Wiley & Sons, Inc., New York (1974) at Chaper 16.

The chromate conversion layer may be conveniently applied by means of a known chromating process. Preferably, a golden yellow (yellow iridescent) chromate conversion layer is applied. A dark olive drab, or dark black chromate conversion layer may be alternatively applied, if desired. Suitable chromating processes are known in the art. See, for example, Mohler, *Electroplating and Related Processes*, Chemical Publishing Co., Inc., New York (1969) at Chapter 14. Also suitable for this purpose is the chromate conversion layer provided by means of the Alodine process described in Spruance, Jr., U.S. Pat. No. 2,438,877.

Preferably, the polymeric coating is applied within approximately two weeks after the zinc and chromate conversion layers are applied. In some instances, if the polymeric coating is not applied until later than approximately two weeks after the zinc and chromate conversion layers are applied, a bond of reduced adhesive strength tends to form between the chromate conversion layer and the polymeric coating. The applied chromate conversion layer, if more than approximately two weeks old, can be rejuvenated, however, by means of a chemical post-treatment process. For this purpose, an aqueous sulfuric acid dip can be employed or an aqueous solution of sodium dichromate acidified with sulfuric acid.

It is believed that the polymeric coating, which is thermoplastic, fuses partially as the nail or other fastener is driven, because of friction-generated heat, but resolidifies quickly. It is also believed that, while it is fused partially, the polymeric coating acts as a lubricant so as to reduce the penetration force. It is further believed that, as the polymeric coating resolidifies, the polymeric coating bonds mechanically to the wood fibers surrounding the fastener so as to increase the withdrawal force.

Where the polymeric coating remains intact, the polymeric coating together with the zinc and chromate conversion layers protect the nail or other fastener against corrosion. In regions where the polymeric coating has been chipped or torn away, as where the nail or other fastener has been struck by means of a driving element of a fastener-driving tool, the zinc and chromate conversion layers nevertheless protect the nail or other fastener against corrosion.

As an alternative to or as an adjunct to such zinc and chromate conversion layers, a protective coating of a different type may be applied to the fastener so as to cover the metal surfaces of the nail or other fastener, before the polymeric coating noted above is applied thereto. The protective coating may be, for example, a zinc phosphate layer or an iron phosphate layer. Such a phosphate layer may be applied by means of dipping the nail or other fastener into a phosphating bath of a suitable composition. Alternatively, the protective coating may be a layer of tin, zinc, aluminum, or stainless steel, as applied to the metal surfaces of the nail or other fastener in accordance with a flame-spraying or plasma-spraying process.

The polymeric coating can be advantageously used with any type of wood. The polymeric coating provides excellent results with wood that stains easily, such as, for example, cedar or redwood, and with wood that has been chemically treated, such as, for example, copper-chromium-arsenate treated wood.

A coated fastener according to this invention is superior to other fasteners used in connection with wood construction in that a coated fastener according to this invention exhibits a reduced penetration force, an increased withdrawal force, and a reduced corrosion tendency.

Figure 2:
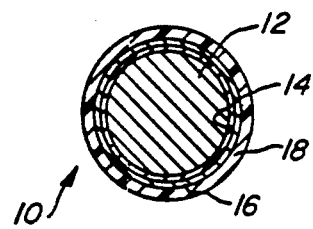
FIG. 2 is a cross-sectional view on a slightly larger scale, as taken along plane 2—2 of FIG. 1 in a direction indicated by means of the arrows.

A coated nail 10, as shown in FIGS. 1 and 2, constitutes a preferred embodiment of this invention.

The coated nail 10 has a metal body 12, which is made of carbon steel, preferably AISI C 1008 steel. Its metal surfaces are covered completely with an inner zinc layer 14, an intermediate chromate conversion layer 16, and an outer, thermoplastic, predominantly aliphatic polyurethane coating 18.

The inner zinc layer 14, as applied by means of a known electroplating process, has a thickness of at least 0.5 mil so as to comply with Federal Building Code FF-N-105B, which is referenced to ASTM Specification A641, Class 1, Type 2. Preferably, as applied over the inner zinc layer 14 by means of a known chromating process, the chromate conversion layer 16 is a golden yellow (yellow iridescent) chromate conversion layer. A dark olive drab or dark black chromate conversion layer may be alternatively applied over the zinc layer 14, if desired.

As applied over the zinc and chromate conversion layers by means of the method disclosed herein, preferably within approximately two weeks after such layers are applied, the outer polyurethane coating 18 has a thickness of approximately 0.5 mil.

Figure 3:
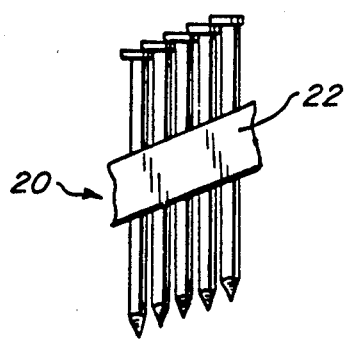
FIG. 3 is a fragmentary, elevational view on a slightly smaller scale, showing a collated strip of nails similar to the nail of FIG. 1.

As shown in FIG. 3, a plurality of coated nails 20, each of which is similar to the coated nail 10, are collated into a strip, which fits into a magazine (not shown) of a fastener driving tool, by means of a pair of collating tapes 22 (one shown) generally as disclosed in Langas et al. U.S. Pat. No. 3,276,576. The coated nails 20 are situated between the collating tapes 22 and are adhesively attached thereto.

The metal surfaces of each coated nail 20 are completely covered with an inner zinc layer 14, as described above, and with an intermediate chromium conversion layer, as described above. The zinc and chromate conversion layers are applied to each coated nail 20 before such coated nail 20 is situated between and adhesively attached to the collating tapes 22.

Moreover, the metal surfaces of each coated nail 20 are covered at least substantially with an outer, thermoplastic, predominantly aliphatic polyurethane coating, as described above. Preferably, a continuous outer polyurethane coating is applied to each coated nail 20 before such coated nail 20 is adhesively attached to and between the collating tapes 22. However, the outer polyurethane coating may be alternatively applied to each coated nail 20 after such coated nail 20 has been adhesively attached to and between the collating tapes 22, in which event the outer polyurethane coating upon each coated nail 20 is discontinuous in those regions where such coated nail 20 is masked by means of the upon adhesive the collating tapes 22.

Furthermore, this invention may be advantageously applied to such coated nails (not shown) collated by means of other known types of collating media, such as, for example, polymeric collating media or welded collating wires.

Figure 4:
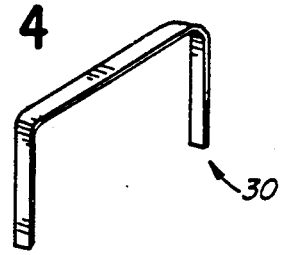
FIG. 4 is a perspective view of a staple constituting an alternative embodiment of this invention.

A coated staple 30, as shown in FIG. 4, constitutes yet another embodiment of this invention.

The coated staple 30 has a metal body, which is made of carbon steel, preferably AISI C 1008 steel. Its metal surfaces are completely covered with an inner zinc layer, as described above, an intermediate chromate conversion layer, as described above, and an outer, thermoplastic, predominantly aliphatic polyurethane coating, as described above.

The coated staple 30 may be one of a series (not shown) of similar staples that are collated. The outer, thermoplastic, predominantly aliphatic polyurethane coating upon each of such staples including the coated staple 30 may be advantageously used to collate such staples by being applied to such staples after such staples have been placed in a series, that is, in side-to-side relationship with respect to one another.

Figure 5:
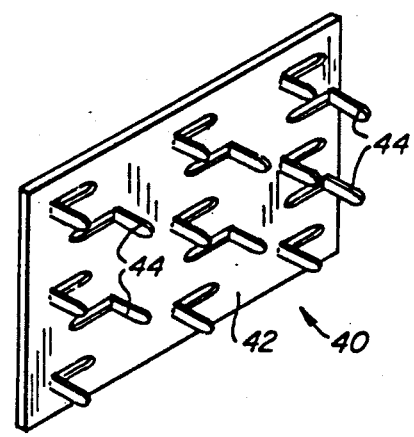
FIG. 5 is a simplified, perspective view of a truss plate constituting a further embodiment of this invention.

A coated truss plate 40, as shown in FIG. 5, constitutes yet another embodiment of this invention.

The coated truss plate 40 is formed from a planar member 42, from which a plurality of pointed teeth 44 are struck. The truss plate 40 usually is made of carbon steel, such as, for example, AISI C 1008 steel. Preferably, the truss plate 40 is covered in its entirety with an inner zinc layer, as described above, an intermediate chromium conversion layer, as described above, and an outer, thermoplastic, predominantly aliphatic polyurethane coating, as described above.

The coated truss plate 40 may be alternatively made from a galvanized, that is, zinc-coated, steel sheet, which sheet has been galvanized by means of a hot-dip or other process. When the teeth 44 are struck from the planar member 42, the edges of the teeth 44 and the edges of the openings remaining within the planar member 42 by means of the teeth 44 are exposed without any zinc coating upon the exposed edges. In order to provide corrosion protection for such exposed edges, the truss plate 40 may be subsequently immersed within a phosphating bath so as to apply a phosphate coating upon the exposed edges as well as upon the other parts of the metal body. A zinc phosphate coating is preferred. An iron phosphate coating may be alternatively applied. Next, an intermediate chromate conversion layer, as described above, and an outer, thermoplastic, predominantly aliphatic polyurethane coating, as described above, are applied to the truss plate 40 in its entirety. The intermediate chromium conversion layer may be optionally omitted.

The preferred polymeric coating materials contemplated by means of this invention are water-dispersible, thermoplastic polymers that contain as a major constituent thereof a film-forming aliphatic polyurethane that may or may not be blocked. The novel fasteners embodying this invention have their surfaces in contact with the polymeric residue produced, as mentioned above, by removing the water from an aqueous dispersion of a film-forming, thermoplastic, predominantly aliphatic polyurethane resin. The term "aliphatic", as used herein and in the appended claims, encompasses straight-chain aliphatic as well as alicyclic or cycloaliphatic polyurethane resins. Upon drying at an elevated temperature, these aliphatic polyurethane resins form a film that may include cross-linked aliphatic polyurethane chains.

The film-forming, thermoplastic polyurethane resin compositions based upon predominantly aliphatic components and thus suitable for practicing the present invention are aqueous dispersions, that is, emulsions or solutions, of aliphatic polyurethane polymers that are the reaction products of a linear, branched, or cyclic aliphatic isocyanate with a linear, branched or cyclic aliphatic polyhydroxylated organic compound, such as, for example, a polyol such as, for example, ethylene glycol, penetanediol, diethylene glycol, and the like, or a hydroxyl-terminated polyether or polyester, such as, for example, poly(oxytetramethylene)diol, and the like. The term "predominantly aliphatic", as used herein and in the appended claims, denotes a resin that may contain a minor amount of an aromatic material as long as such material does not permit light-degradation of the polyurethane so as to cause an unacceptable or non-aesthetic degree of discoloration or coating discontinuity. Anionic or non-ionic surfactants are usually present in these dispersions.

Particularly suitable aqueous, aliphatic, polyurethane resin-containing dispersions suitable for the present purposes include NeoRez XR-9637 TM aqueous dispersions and blends of NeoRez XR-9637 TM with a minor amount of a NeoCryl A-600 TM series aqueous acrylic dispersion, all commercially available from ICI Resins (Polyvinyl Chemical Industries), Wilmington, Mass. These dispersions are formed by dissolving the film-forming aliphatic polyurethane resin, or prepolymer, within a suitable non-reactive organic solvent for the resin, adding a sufficient amount of the surfactant having the appropriate hydrophylic-lipophylic balance (HLB) value, and then gradually mixing the obtained solution with sufficient water so as to form a stable emulsion of droplets of the produced solution in water. The emulsion may contain accelerators, if desired, as well as, for example, optional cross-linking agents such as water-reducible hexamethoxylated melamine resins or the like.

The foregoing dispersions are thermoplastic polyurethane resin lattices of a relatively high molecular weight, aliphatic, isocyanate-based, film-forming thermoplastic elastomer within a water dispersion with an anionic or non-ionic surfactant.

Blocked film-forming aliphatic polyurethane resins suitable for present purposes are formed by means of the reaction of an aliphatic polyisocyanate, e.g., 1,6-hexamethylene diisocyanate (HDI), 4'-diisocyanatodicyclohexylmethane (HMDI), isophorone diisocyanate (IPDI), or the like, adducts of polyol or hydroxyl-terminated polyether or hydroxyltterminated polyester resins with an end-blocking compound containing active hydrogen atoms, such as, for example, an amide or a polyamide, in accordance with conventional techniques for the production of blocked polyurethane resins. Illustrative of these resins are Rucothane Latexes 2010L, 2030L, 2040L, and 2060L, all commercially available from the Ruco Division of Hooker Chemical Corporation, Niagara Falls, N.Y., and the like.

The amount of the film-forming aliphatic polyurethane resin present within the aqueous coating composition is within the range of approximately 10 to approximately 50 percent by weight, based upon the weight of the coating composition. The solids content can be adjusted so as to provide the desired viscosity for the coating composition. Preferably, a coating composition suitable for dipping contains approximately 20 to approximately 23 percent by weight of the aliphatic polyurethane resin, based upon the weight of the coating composition.

The aqueous coating composition can be applied to the fastener in any convenient manner, such as, for example, by means of dipping, spraying, roller coating, or the like expedients, depending upon the nature and configuration of the fasteners involved. A preferred method of application, suitable for use with a wide variety of fasteners, is dipping.

The aqueous coating composition is applied to the fastener so as to provide, after drying, a film-like solid deposit that is present upon the fastener as a substantially continuous film encasing the fastener and having a thickness of approximately 0.2 mil to approximately 2 mils. A preferred coating thickness is approximately 0.5 mil.

Drying, and possible curing, of the aliphatic polyurethane resin deposited upon the fastener is effected by drying the coated fasteners at a temperature of approximately 145° F., or higher, but below the degradation temperature of the cured aliphatic polyurethane. Preferably, the temperature is in a range of from approximately 145° F. to approximately 155° F. More preferably, the temperature is approximately 150° F. The degree of cross-linking in a particular instance is dependent upon the specific composition of the film-forming aliphatic polyurethane resin aqueous dispersion and the cross-linking agent, and/or accelerators that may be present.

One example of carrying out the improved method of this invention is described below. Nails made of AISI C 1008 steel are cleaned within an alkaline bath, rinsed, pickled within an acidic bath, rinsed, galvanized, and rinsed. The nails are galvanized so as to comply with ASTM Specification A641, Class 1, Type 2. Next, a chromate conversion layer is applied to the nails. Thereafter, the thus treated nails are rinsed and overcured.

Next, these nails are collated into strips by means of adhesive tapes. The collated nails are preheated within a preheating zone at a temperature within a range of approximately 105° F. to approximately 140° F. The preheated strips are dipped into an aqueous coating composition containing approximately 20 to approximately 23 percent by weight of the aliphatic polyurethane resin (NeoRez XR-9637 TM), based upon the weight of the coating composition, to provide a dry coat thickness of approximately 0.35 mil to approximately 0.55 mil. The coating composition has a viscosity of approximately 34 to approximately 38 seconds, measured with a No. 1 Zahn cup. Air jets are used to remove any excess coating composition and also to drive the coating composition into regions covered by means of the collating tapes.

The collated nails, as coated by means of the coating composition noted above, are heated within a heating zone, by means of infrared lamps, to a temperature of approximately 145° F. to approximately 155° F. Residence time within the heating zone is approximately 15 seconds. A tough, adherent coating is formed upon the nails during heating.

Next, the collated nails are removed from the heating zone and are cooled within a cooling zone by means of circulating air at room temperature. Circulation is effected by means of blowers. The collated and cooled nails are then packaged.

Various modifications may also be made in the novel fastener provided by this invention, or in the novel method provided by this invention, without departing from the scope and spirit of this invention, as defined in the appended claims. It is therefore to be understood that within the scope of the appended claims, the present invention may be practiced otherwise than as specifically described herein.

We claim:

1. A method for producing a metal fastener, which comprises the steps of:
    applying a zinc coating over substantially the entire metal surface of said metal fastener;
    applying a chromate conversion coating upon said zinc coating;
    applying an aqueous dispersion coating containing a film-forming, thermoplastic, predominantly aliphatic polyurethane resin upon said chromate conversion coating; and
    heating said fastener, having said zinc, chromate conversion, and aqueous dispersion coatings applied thereto, to an elevated temperature greater than room temperature so as to remove water from said applied aqueous dispersion coating and thereby form a protective film upon said fastener from said predominantly aliphatic polyurethane resin residue which also covers said zinc and chromate conversion coatings.

2. The method in accordance with claim 1 wherein said elevated temperature is in the range of approximately 145° F. to below the thermal degradation temperature for the applied resin.

3. The method in accordance with claim 2 wherein said elevated temperature is in the range of approximately 145° F. to approximately 155° F.

4. The method in accordance with claim 2 wherein said elevated temperature is approximately 150° F.

5. The method in accordance with claim 1 wherein the dispersion is applied to the metal fastener by dipping.

6. The method in accordance with claim 1 wherein said chromate conversion coating is no more than approximately two weeks old.

7. The method as set forth in claim 1, wherein:
    said dispersion is applied to said fastener by spraying.

8. The method as set forth in claim 1, wherein:
    said dispersion is applied to said fastener by roller coating.

9. The method as set forth in claim 1, wherein:
    said zinc coating is applied to said fastener by electroplating.

10. The method as set forth in claim 9, wherein:
    said zinc coating has a thickness within the range of approximately 0.2-0.6 mil.

11. The method as set forth in claim 1, wherein:
    said metal fastener is formed from carbon steel.

12. The method as set forth in claim 1, wherein:
    said polyurethane resin residue film has a thickness within the range of approximately 0.2-2 mil.

13. The method as set forth in claim 1, wherein:
    said aqueous dispersion comprises a coating composition containing approximately 20-23 percent by weight of said aliphatic polyurethane resin based upon the weight of said coating composition.

14. A method for producing a metal fastener suitable for use in connection with wood construction, comprising the steps of:
    applying a zinc layer over substantially the entire metal surface of said metal fastener;
    applying a chromate conversion layer upon said zinc layer; and
    applying a thermoplastic, predominantly aliphatic polyurethane coating over said chromate conversion layer.

15. A method as set forth in claim 14, wherein:
    said zinc layer has a thickness of approximately 0.2-0.6 mil; and
    said polyurethane coating has a thickness of approximately 0.2-2 mil.

16. A method as set forth in claim 14, wherein:
    said metal fastener is formed from carbon steel.

17. A method as set forth in claim 14, wherein:
    said polyurethane coating comprises an aqueous dispersion containing a film-forming, thermoplastic, predominantly aliphatic polyurethane resin which is approximately 20-23 percent by weight based upon the weight of said coating composition.

18. A method for producing a metal fastener, comprising the steps of:
    applying a protective coating over substantially the entire metal surface of said metal fastener, said protective coating comprising at least one of the components chosen from the group of zinc phosphate, iron phosphate, tin, zinc, aluminum, or stainless steel; and
    applying an aqueous dispersion coating containing a film-forming, thermoplastic, predominantly aliphatic polyurethane resin upon said protective coating; and
    heating said fastener, having said protective and aqueous dispersion coatings thereon, to an elevated temperature greater than room temperature so as to remove water from said applied aqueous dispersion coating and thereby form a protective film upon said fastener from said predominantly aliphatic polyurethane resin residue which also covers said protective coating.

19. The method as set forth in claim 18, wherein:
    said protective coating is applied to said metal fastener by means of a flame-spraying process.

20. The method as set forth in claim 18, wherein:
    said protective coating is applied to said metal fastener by means of a plasma-spraying process.

21. The method as set forth in claim 18, wherein:
    said aqueous dispersion coating comprises a coating composition containing approximately 10-50 percent by weight of said aliphatic polyurethane resin based upon the weight of said coating composition.

22. The method as set forth in claim 21, wherein:
    said aqueous dispersion coating comprises a coating composition preferably containing approximately 20-23 percent by weight of said aliphatic polyurethane resin based upon the weight of said coating composition.

23. The method as set forth in claim 6, further comprising the step of:
rejuvenating said applied chromate conversion coating prior to applying said aqueous dispersion coating, when said applied chromate conversion coating is more than approximately two weeks old, by means of a chemical post-treatment process comprising an aqueous sulfuric acid dip.

24. The method as set forth in claim 6, further comprising the step of:
rejuvenating said applied chromate conversion coating prior to applying said aqueous dispersion coating, when said applied chromate conversion coating is more than approximately two weeks old, by means of a chemical post-treatment process comprising an aqueous solution of sodium dichromate acidified with sulfuric acid.

* * * * *